United States Patent

Lee

[11] Patent Number: 6,112,643
[45] Date of Patent: Sep. 5, 2000

[54] HEATING POT FOR DECOCTING CHINESE HERBS

[76] Inventor: Sang-jun Lee, 221-38 Suyu 3-dong, Kangbuk-gu, Seoul, Rep. of Korea

[21] Appl. No.: 09/311,989

[22] Filed: May 14, 1999

[30] Foreign Application Priority Data

Jun. 8, 1998 [KR] Rep. of Korea ............. 98-21067

[51] Int. Cl.$^7$ .............. A47J 37/04; F27D 11/00
[52] U.S. Cl. ............... 99/293; 99/323.3; 99/410; 99/413; 219/430; 219/433
[58] Field of Search .................. 99/275, 323.3, 99/403, 410, 413, 293; 219/430, 432, 433, 438

[56] References Cited

U.S. PATENT DOCUMENTS 5,107,096   4/1992   Knees ................................ 99/410 X
5,619,905   4/1997   Wu .................................... 99/323.3
5,782,165   7/1998   Glenboski et al. ............... 99/413 X Primary Examiner—Reginald L. Alexander
Attorney, Agent, or Firm—Orum & Roth

[57] ABSTRACT

A heating pot for decocting Chinese herbs, including a container for containing Chinese herbs, and a heater including a body provided with a predetermined space to prevent contact with the received container, for protecting the container, a ray generation member installed between the body and the container for generating high temperature rays, and a main reflection member installed on the inner surface of the body for reflecting the rays toward the container.

14 Claims, 4 Drawing Sheets us 6,112,643

HEATING POT FOR DECOCTING CHINESE HERBS

BACKGROUND OF THE INVENTION

1. Field of the Invention

The present invention relates to a Chinese herb decoction heating pot for decocting Chinese herbs with light rays.

2. Description of the Related Art

When Chinese herbs are decocted, some Chinese herbs and water of about 70 hobs (1 hob=0.381 U.S. pint) are placed in a pot, and then must be decocted for a long time until the amount of the Chinese herb fluid is reduced to about 1 hob. In order to make red ginseng, ginseng and water are placed together in a container and then must be boiled for 48 hours or longer.

As described above, apparatuses for decocting Chinese herbs or those for boiling ginseng to make red ginseng have been disclosed in Korean Patent Application No. 87-4352, Korean Utility Model Registration Nos, 14210, 47911, and 059092, Japanese Uitlity Model Registration Nos. 1775361 and 1954554, and U.S. Pat. No. 4,759,275.

For example, "Chinese herb decocting pot using far infrared rays" has been disclosed in Korean Patent Application No. 87-4352. The invention "Chinese herb decocting pot using far infrared rays" comprises a far infrared ceramic heater, an exterior pot made of thermotempered glass and installed in contact with the ceramic heater, an interior pot installed inside the exterior pot, and a ceramic filtering plate attached on the bottom of the interior pot. Infrared rays generated from the ceramic heater heats a medicinal fluid and Chinese herbs by concentratedly heating the bottom of the pot.

However, these apparatuses have the following problems.

First, since Chinese herbs are decocted by the ceramic heater concentratedly heating the bottom of the internal pot, the medicinal fluid or the Chinese herbs are scorched or burnt. That is, the Chinese herbs typically contain many herbal medicines and mineral matters, and the mineral matters, horns, bones, clams, etc. are settled without floating on the water. Thus, in the course of decocting these Chinese herbs, the horns, bones, clams, etc., are piled up thickly on or scorched and stick to the bottom of the pot, and they are burnt in the worse case. Also, in order to make red ginseng, ginseng and water are placed together in a pot and then must be boiled for 48 hours or longer. Here, as the water evaporates, the ginseng is scorched or burnt on the bottom of the pot. Hence, much care is required to decoct Chinese herbs or ginseng for a long period of time.

Second, infrared rays generated from the ceramic heater are not entirely absorbed to the interior pot and the filtering plate but partially reflected by them to be discharged to the outside of the exterior pot. Thus, thermal efficiency is not good.

Third, the interior pot and the filtering plate are installed inside the exterior pot, so that it is inconvenient to use them. Also, the manufacturing costs are increased.

SUMMARY OF THE INVENTION

To solve the above problems, it is an objective of the present invention to provide a heating pot which prevents Chinese herbs from being scorched or burnt and can maximize thermal efficiency.

To achieve the above objective, there is provided a heating pot for decocting Chinese herbs, comprising: a container for containing Chinese herbs; and a heater including a body provided with a predetermined space to prevent contact with the received container, for protecting the container, a ray generation means installed between the body and the container for generating high temperature rays, and a main reflection means installed on the inner surface of the body for reflecting the rays toward the container.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 1:
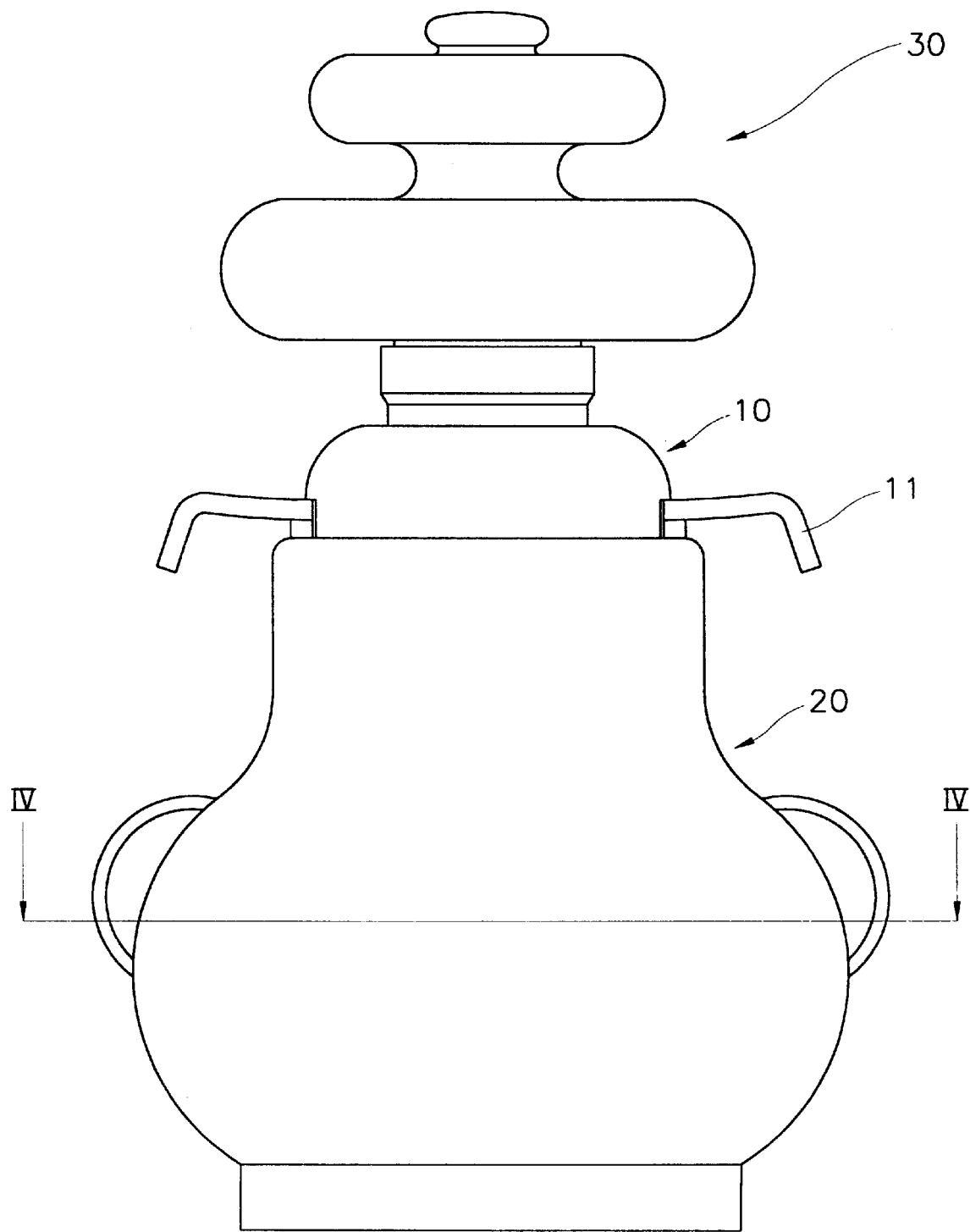
FIG. 1 is a side view of a heating pot according to an embodiment of the present invention.

Referring to FIGS. 1 through 4, a heating pot for decocting Chinese herbs or making ginseng into red ginseng comprises a container 10 for containing Chinese herbs, and a heater 20 for receiving the container 10 and heating the received container 10.

The container 10 is made of thermotempered glass to transmit light rays well, preferably infrared rays. A knob and protrusion 11 is installed on the upper portion of the container 10 to be hung on the entrance of the heater 20 so that the bottom surface of the container 10 does not touch the bottom of the heater 20. Preferably, a reflection layer 10a for reflecting light rays, preferably, infrared rays toward the inside of the container, or an absorption layer 10b for absorbing the infrared rays, is installed on the exterior of a portion of the container 10 not inserted into the heater 20. For example, it is preferable that the reflection layer 10a is made of a metallic material such as aluminum, stainless steel, gold, etc., and that the absorption layer 10b is made of a material such as cloth or leather. The reflection layer 10a reflects the infrared rays toward the interior of the container to prevent heat from being discharged to the outside, and the absorption layer 10b keeps the interior of the container warm while absorbing heat. However, if the reflection layer 10a can reflect rays toward the interior of the container, even though it is made of a nonmetallic material, the non-metallic reflection layer 10a can provide the effects of the present invention.

Figure 2:
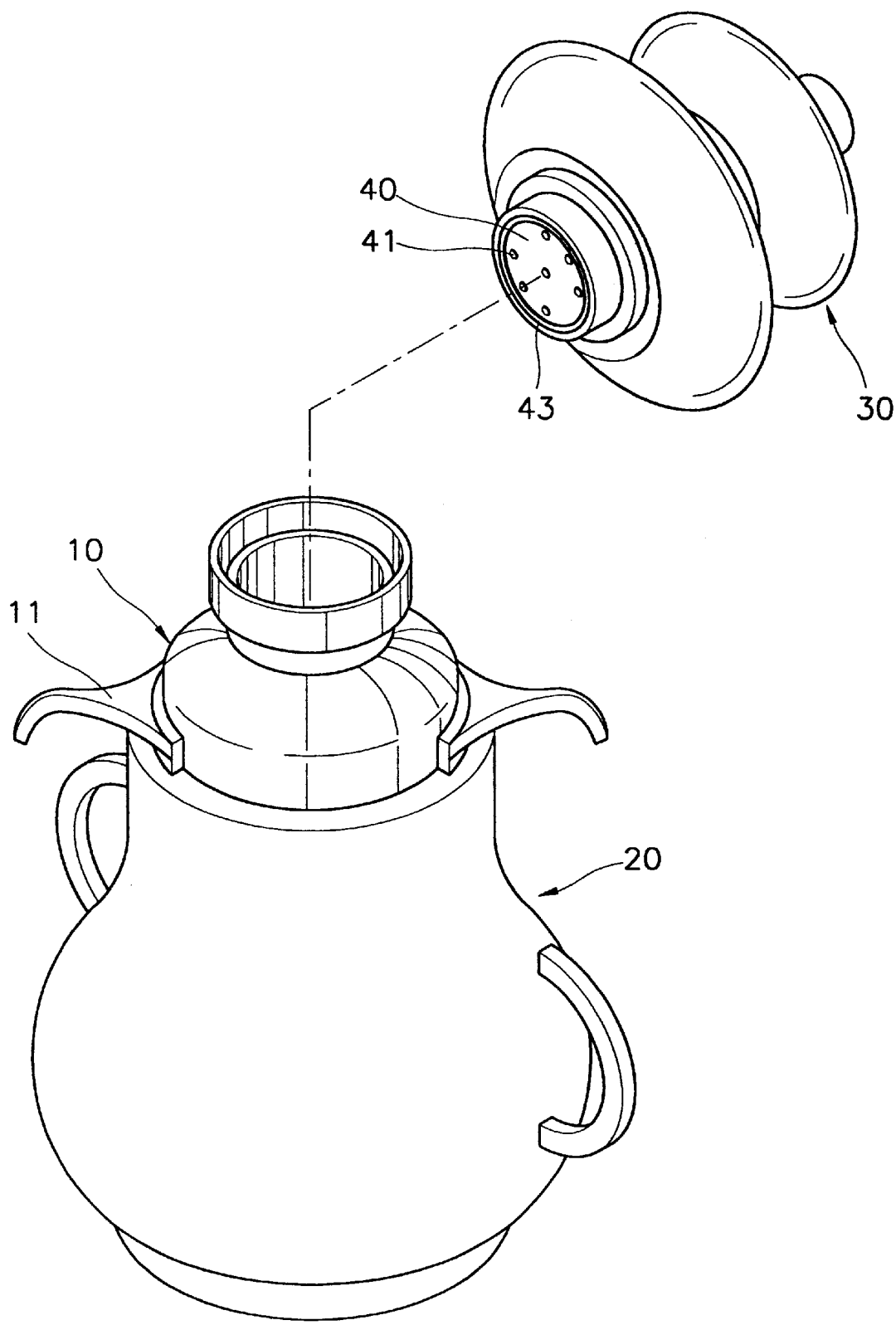
FIG. 2 is an exploded perspective view of the heating pot of FIG. 1.

Referring to FIG. 2, a condenser 30 for condensing essential medicinal elements in vapor is installed on the entrance of the container 10. The condenser 30 is made of glass. A reflection lid 40 made of a stainless plate or an aluminum plate surrounded by a silicon 43 is installed on the entrance of the condenser 30. The reflection lid 40 has holes 41 leading to the interior of the condenser 30.

When the condenser 30 is installed on the container 10, the reflection lid 40 reflects infrared rays within the container 10 toward the inside of the container 10 without the infrared rays escaping to the outside, and the holes 41 formed in the reflection cover 40 delays the inflow of heated steam from the container to the condenser 30 to induce the steam to be condensed within the container 10.

Figure 3:
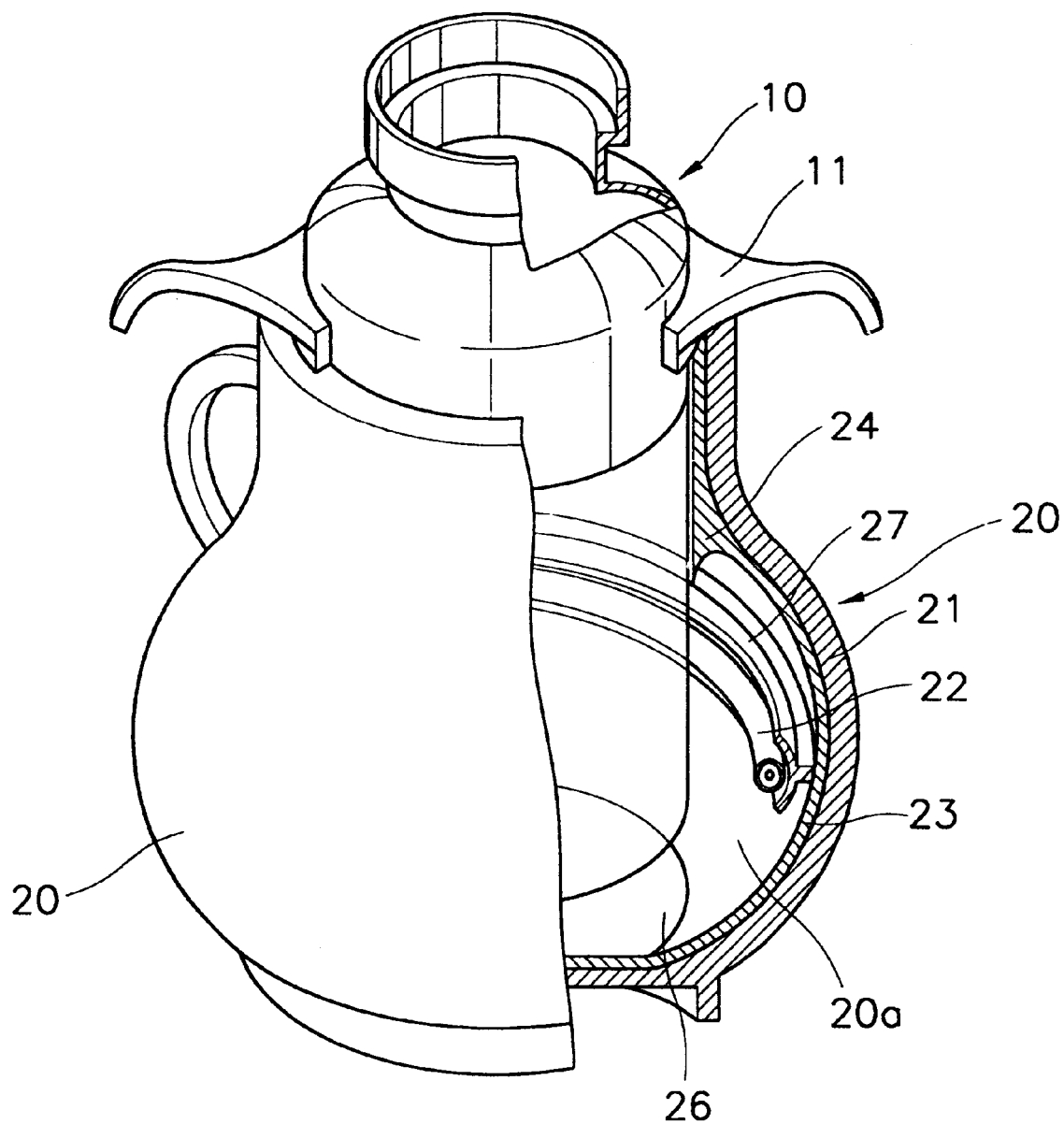
FIG. 3 is a partially-opened perspective view of the heating pot of FIG. 1.

Referring to FIG. 3, the heater 20 is comprised of a body 21 protecting the container 10, a ray generation means 22 installed between the body 21 and the container 10 for generating rays, preferably, infrared rays, and a main reflection means 23 installed on the inner surface of the body 21 for reflecting the rays, preferably, the infrared rays. An insertion space 20a is provided inside the body 21 such that the container 10 can be inserted into the heater 20. This body is made of a heat shield material, preferably, a phenol resin. Here, if the main reflection means can reflect rays, even though it is made of a non-metallic material, the non-metallic main reflection means can provide the same effects as the present invention.

The inner surface of the body 21 is concave to prevent infrared rays generated by the ray generation means 22 from being reflected toward the entrance of the container 10. Here, a downward protrusion 24 is formed from the entrance of the body 21 to the starting portion of the concave portion. The protrusion 24 allows water poured into the entrance of the body 21 to drop down to the bottom 26 without flowing into the ray generation means 22.

The main reflection means 23 is preferably made of a material capable of reflecting infrared rays without absorbing them, e.g., a metal material such as stainless steel or a gold-plated material.

Preferably, an auxiliary reflection means 27 for reflecting rays to the container 10 is installed between the ray generation means 22 and the main reflection means 23. The auxiliary reflection means 27 is adjacent to the ray generation means 22, so that it can effectively reflect infrared rays not proceeding toward the container 10.

Figure 4:
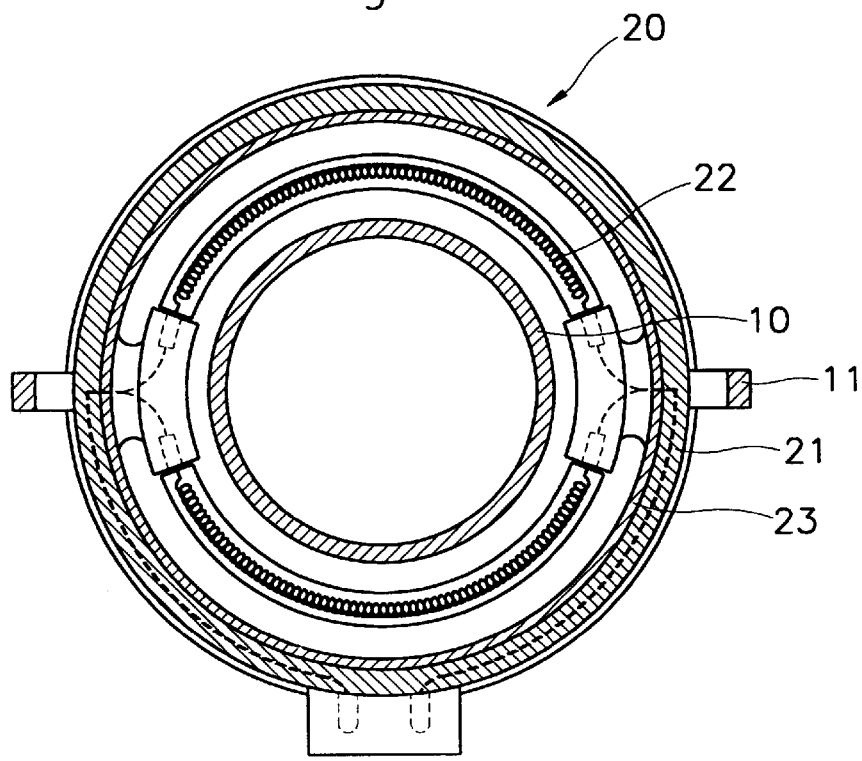
FIG. 4 is a cross-sectional view taken along line IV—IV of FIG. 1.
Figure 5:
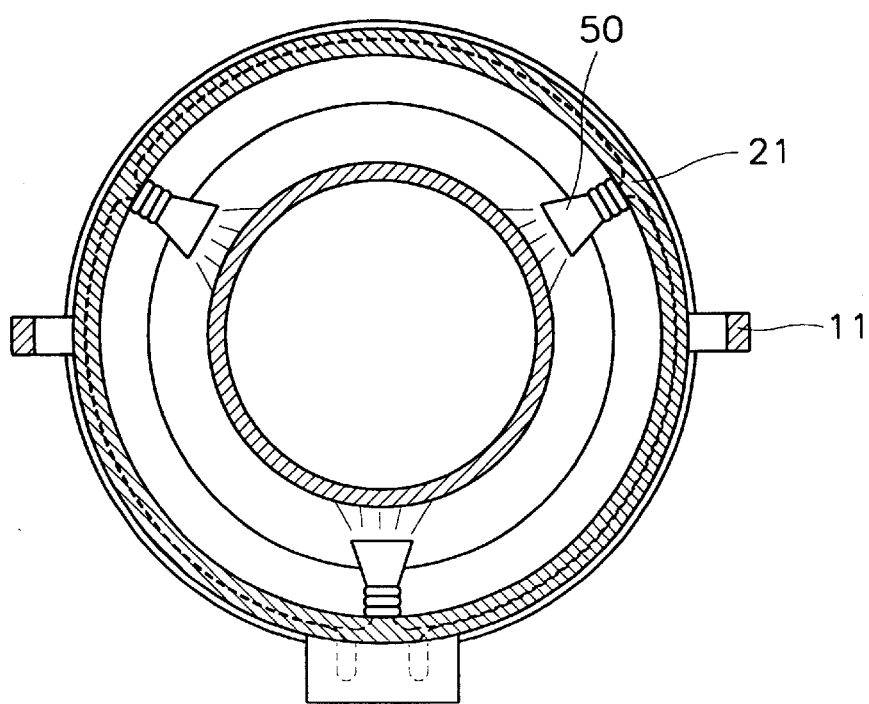
FIG. 5 is a cross-sectional view of a heating pot according to another embodiment of the present invention.

The ray generation means 22 can be realized in several forms such as an arched halogen lamp, an argon lamp, an infrared lamp, and a ceramic heater as shown in FIG. 4, or can be realized as a plurality of independent lamps 50 as shown in FIG. 5. The use of the halogen lamp among the above-mentioned lamps is preferred considering the price and the durability.

The heating pot according to the present invention including the above-described components decocts Chinese herbs as follows.

Referring to FIGS. 3 and 4, some of the infrared rays generated by the ray generation means 22 pass through the container 10, and the rest is reflected by the main reflection means and the auxiliary reflection means. Some of the infrared rays passed through the container 10 are applied to Chinese herbs and a medicinal fluid. The infrared rays passed through or reflected by the container 10 are reflected by the main reflection means 23 and the auxiliary reflection means 27 and finally applied to the Chinese herbs and the medicinal fluid. As described above, the infrared rays three-dimensionally heat the Chinese herbs and the medicinal fluid from all directions to prevent them from being scorched or burnt, thus increasing thermal efficiency.

The reflection lid 40 of the condenser 30 reflects infrared rays generated by the ray generation means 22 back into the container 10, and the holes 41 of the reflection lid 40 delay the inflow of heated steam into the condenser 30 to prevent transmission of heat to the condenser. Thus, the energy used to decoct Chinese herbs and medicinal fluid can be minimized, so that the thermal efficiency can be increased to a higher level.

According to experiments conducted by the present inventor in which 1000 g of ginseng and 100 g of water are placed together in a container and boiled for 48 hours, the ginseng was neither scorched nor burnt while turning reddish-brown. Thus, the boiled ginseng did not provide a burnt taste or smell, and tasted very good. Infrared rays or visible rays might produce new medicinal elements, or accelerate the generation of the new medicinal elements. Also, new medicinal elements are produced while the ginseng is changed into reddish-brown ginseng, so that the reddish-brown ginseng has an excellent medicinal value.

The technical spirit of the present invention exists not in decoction made by concentratedly heating the bottom of a container with infrared rays or far infrared rays but in decoction made by three-dimensionally heating Chinese herbs and medicinal fluid within the container from all directions, and also in acceleration of the generation of efficacious medicinal elements caused by applying visible rays and ultraviolet rays.

In the heating pot according to the present invention, rays three-dimensionally heat Chinese herbs or medicinal fluid in an area that is five or more times larger than a conventional heating pot, thereby preventing scorching or burning. Therefore, the medicinal value of the decocted Chinese herb fluid is not reduced, and the decocted Chinese herb fluid tastes good. Also, since the rays are not discharged to the outside, the thermal efficiency is excellent. Furthermore, since an interior pot is not installed, the heating pot according to the present invention can be easily used, while the manufacturing costs can be reduced.

What is claimed is:

1. A heating pot for decocting Chinese herbs, comprising: a container for containing Chinese herbs, said container having an entrance; a condenser installed on said entrance for condensing essential medicinal elements into steam; and
a heater including a body provided with a predetermined space to prevent contact with the received container, for protecting the container, a ray generation means installed between the body and the container for generating high temperature rays, and a main reflection means installed on the inner surface of the body for reflecting the rays toward the container.

2. The heating pot for decocting Chinese herbs as claimed in claim 1, wherein a reflection layer for reflecting rays toward the interior of the container is provided on a portion of the container which is not protected by the body.

3. The heating pot for decocting Chinese herbs as claimed in claim 1, wherein an absorption layer for absorbing rays is provided on the portion of the container which is not protected by the body.

4. The heating pot for decocting Chinese herbs as claimed in claim 1, wherein the ray generation means surrounds the edge of the container in a ring shape.

5. The heating pot for decocting Chinese herbs as claimed in claim 4, wherein the ray generation means is formed of at least one among a halogen lamp, an argon lamp, an infrared lamp, an incandescent electric lamp, and a ceramic heater.

6. The heating pot for decocting Chinese herbs as claimed in claim 2, wherein the ray generation means surrounds the edge of the container in a ring shape.

7. The heating pot for decocting Chinese herbs as claimed in claim 6, wherein the ray generation means is formed of at least one among a halogen lamp, an argon lamp, an infrared lamp, an incandescent electric lamp, and a ceramic heater.

8. The heating pot for decocting Chinese herbs as claimed in claim 3, wherein the ray generation means surrounds the edge of the container in a ring shape.

9. The heating pot for decocting Chinese herbs as claimed in claim 8, wherein the ray generation means is formed of at least one among a halogen lamp, an argon lamp, an infrared lamp, an incandescent electric lamp, and a ceramic heater.

10. The heating pot for decocting Chinese herbs as claimed in claim 1, wherein an auxiliary reflection means for reflecting rays into the container is installed between the main reflection means and the ray generation means.

11. The heating pot for decocting Chinese herbs as claimed in claim 1, wherein the inner surface of the body is concave such that the main reflection means can reflect rays toward the interior of the container.

12. The heating pot for decocting Chinese herbs as claimed in claim 11, wherein a downward protrusion is formed from the entrance of the body to the beginning portion of the concave surface.

13. The heating pot for decocting Chinese herbs as claimed in claim 12, wherein the body is formed of a heat shield material.

14. The heating pot for decocting Chinese herbs as claimed in claim 1, wherein a reflection lid is installed on the entrance of the condenser to reflect rays toward the interior of the container.

* * * * *